United States Patent [19]
Wetch

[11] Patent Number: 4,993,486
[45] Date of Patent: Feb. 19, 1991

[54] HEAT TRANSFER LOOP WITH COLD TRAP

[75] Inventor: Joseph R. Wetch, San Jose, Calif.

[73] Assignee: Space Power, Inc., San Jose, Calif.

[21] Appl. No.: 446,463

[22] Filed: Dec. 5, 1989

[51] Int. Cl.$^5$ .............................................. F28D 15/00
[52] U.S. Cl. ................... 165/104.13; 165/41; 165/104.17; 62/59
[58] Field of Search ............... 165/104.13, 104.17, 165/41; 62/59

[56] References Cited

U.S. PATENT DOCUMENTS

| | | | |
|---|---|---|---|
| 3,869,870 | 3/1975 | Kuehner | 165/104.13 |
| 4,109,702 | 8/1978 | Greene | 165/104.17 |
| 4,219,072 | 8/1980 | Barlow, Sr. | 165/32 |
| 4,219,075 | 8/1980 | Laing | 165/104.17 |
| 4,302,944 | 12/1981 | Gainer | 62/59 |
| 4,366,807 | 1/1983 | Barber, Jr. | 165/104.13 |
| 4,410,031 | 10/1983 | Lindner | 165/10 |
| 4,446,910 | 5/1984 | Miller | 165/10 |
| 4,800,952 | 1/1989 | Kirpich | 165/104.17 |

Primary Examiner—Albert W. Davis, Jr.
Attorney, Agent, or Firm—Martin Fruitman

[57] ABSTRACT

A pumped loop heat transfer system which also stores energy by means of freezing part of the heat transfer liquid. A combination of immiscible liquids is used as the heat transfer fluid in a pumped system with heat exchangers at both the heat sink and the heat source. The liquids have different enough freezing points so that one will solidify in advance of the others, and the liquids are selected for the heat transfer application so that one liquid always remains in the liquid state. The freezing of one component at the heat sink helps to assure the other components will remain liquid, and the remaining liquid prevents expansion related stress and destruction and provides for easy startup of the system, since it begins heat transfer immediately, and its circulation past the frozen component quickly liquifies the solid.

6 Claims, 2 Drawing Sheets

HEAT TRANSFER LOOP WITH COLD TRAP

SUMMARY OF THE INVENTION

This invention deals generally with heat transfer and more specifically with a heat transfer apparatus which includes a change to the solid state of part of the heat transfer liquid.

Many commonly available heat transfer systems use a liquid to move heat from one location to another. Perhaps the most commonly used of these is an automobile cooling system in which heat originating at the engine cylinders is transferred by a mechanically pumped liquid to the radiator from which the heat is discharged into the surrounding air.

As is well understood by even non-technical people, it is undesirable to permit the water, which is the heat transfer liquid in such a system, to freeze, because the volumetric expansion which occurs with freezing can cause mechanical damage to the heat transfer system. It is for that reason that fluids such as antifreeze are added to the automobile cooling systems to prevent freezing. The antifreeze dissolves into and forms a soluble mixture with the water, and the freezing point of the entire mixture is thus lowered to a temperature which is below that to which the system is expected to be subjected.

Moreover, another problem occurs when a liquid heat transfer system freezes, and that problem is not so well understood, mostly because most systems are not allowed to freeze. The second problem is that of restarting a heat transfer system which is frozen, even if there has been no mechanical failure. In every day experience, automobile mechanics all know that the problem of a frozen cooling system is best solved by patience. Usually, the vehicle is placed in a warm location for a long period of time to allow the frozen coolant to liquify. Since the frozen coolant has most likely blocked some flow passages, starting the engine and applying heat to the system in which liquid can not flow freely would simply cause overheating of parts of the system, which is likely to cause new mechanical problems.

While heat transfer systems exist which contain other liquids and use liquid transport methods other than mechanical pumps, for instance, capillary pumping or gravity, precautions against freezing and flow blockages at restart after freezing are necessary in all heat transfer systems which use liquids. The obvious method of taking those precautions is the addition of soluble antifreeze.

However, the present invention takes a different approach which is more suitable for some more exotic applications, particularly those which use liquid metals at high temperatures for the heat transfer liquids, as is frequently done in space and nuclear power applications. For some such systems, even those which are mechanically designed to accommodate to the volumetric change at freezing, it is restart that is the real problem. In a space station or in an atomic power plant there is neither a heated garage in which to put the system nor the time to wait for it to thaw.

The present invention solves both the problem of mechanical damage at freezing and the problem of a slow restart by the use of an immiscible combination of liquids for the fluid in the heat transfer system. An immiscible combination is one in which the components are in contact with each other but none dissolves in the others. In effect, the liquid circulating in the heat transfer loop consists of two or more separate and distinct component liquids which, although thoroughly combined and moving together, remain separate and maintain their own physical properties.

One of these properties which is selected in order for the present invention to function properly is the freezing-melting temperature of each of the components of the immiscible liquid combination. The freezing temperature of one of the components must be distinctly lower than the others, but all the components must be liquid at the normal operating temperature of the system. Under such conditions, one component will selectively freeze first while the remaining components will remain in the liquid state.

This permits the volumetric change which takes place at freezing to be buffered by the remaining liquid, and an expansion chamber for the heat transfer liquid is all that is needed to prevent mechanical damage. Such an expansion chamber is constructed in a portion of the system which is at a location remote from the heat sink, so that it will not be likely to ever contain any frozen material.

The presence of a liquid component throughout the entire heat transfer system also solves the problems of restarting the system after freezing. Since the volume of the solid frozen component is less than the volume of the total system, and particularly since the cross sections of the liquid flow paths at the heat sink, where freezing takes place, can easily be controlled, the remaining liquid will be able to flow throughout the entire system. Therefore, at restart the liquid will easily remove heat from the region of the heat source and cool the heat source. Moreover, while transferring the heat to the heat sink region, the remaining liquid will quickly melt the frozen component and reestablish fully normal operation because it is in direct thermal contact with the frozen component.

The present invention therefore both prevents the usual damage that occurs when a liquid heat transfer loop is cooled to the freezing point of the liquid heat transfer medium, and it also permits safe automatic restart of such a system after freezing.

DETAILED DESCRIPTION OF THE INVENTION

Figure 1:
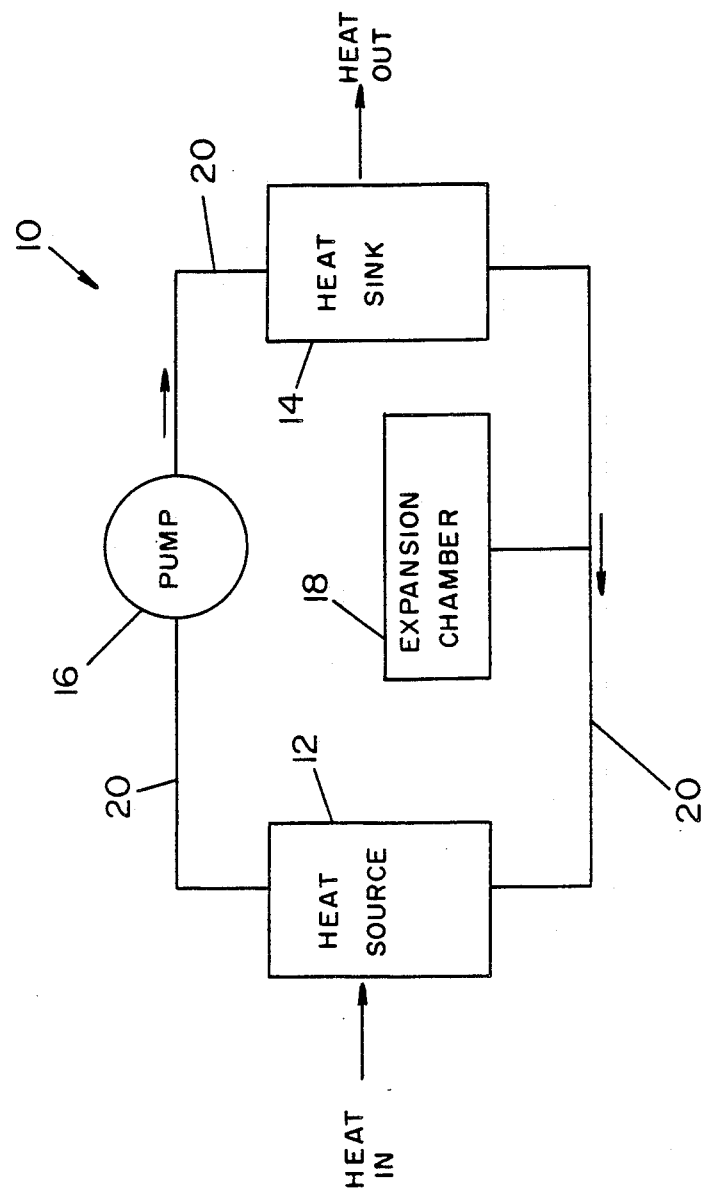
FIG. 1 is a simplified schematic block diagram of the preferred embodiment of the invention.

A simplified schematic block diagram of the preferred embodiment of the invention is shown in FIG. 1, in which heat transfer system 10 is constructed essentially of heat source 12, heat sink 14, pump 16 and expansion chamber 18, which are interconnected by pipes 20.

Although the apparatus pictured does not differ from a conventional liquid heat transfer system, the essential difference of the present invention from the prior art is the nature of the liquid within the system, which can not be pictured. In the preferred embodiment of the invention, the liquid within heat transfer system 10 is a combination of two immiscible liquids. In such a combination the best properties of each component can be utilized.

One such combination which is a suitable example is 75% lithium and 25% sodium-potassium alloy. Lithium has excellent heat transport characteristics, but is frozen at room temperature, while sodium-potassium alloy remains liquid to −11 degrees C. and has much poorer heat transfer properties.

With lithium, because of its high heat capacity, low density, and high boiling point, the pumping power required to transport heat in a thermal loop, such as heat transfer system 10 pictured in FIG. 1, at a given temperature rise and fall, is lower than for any other liquid metal. In addition, since the density of lithium is low, the mass of the quantity of lithium required to fill any given heat exchanger system is lower than for other liquid metals. Moreover, because of its high heat capacity, the working fluid temperature rise at the heat source and the temperature drop at the heat sink can be less with lithium than with any other liquid metal. Nevertheless, if a heat transfer system containing lithium is allowed to cool below the lithium freezing temperature, the lithium in the system will solidify, with the locations of the solids and the voids resulting from freezing being randomly determined by system geometry and gravitational effects, among other factors.

Once freezing has occurred, it is a time consuming process to thaw the system by conducting heat through the solid lithium and the voids in order to restart the heat transfer process. Heaters and bypass loops, which are sometimes used to aid thawing, add complexity and losses to such systems. There is also danger that the system's expansion chamber may not be in hydraulic communication with the lithium thawing region, and therefore large stresses may develop, because lithium increases its volume as it changes to liquid.

On the other hand, while sodium-potassium alloy remains liquid to a temperature much below the freezing temperature of lithium, it requires about 30 times more pumping power than does lithium in the same size system.

Therefore, by using a combination of 75% lithium and 25% sodium-potassium alloy in the example of the preferred embodiment, the advantages of both components can be realized. Such a combination has virtually all the pumping power advantages of pure lithium. On cooldown of the system, a cold trapped layer of lithium is formed on the inside surfaces of the passages of heat sink 14, leaving a flow path for sodium-potassium alloy in the central portions of the passages of heat sink 14 and a continuous circuit of sodium-potassium alloy throughout heat transfer system 10.

Therefore, at startup, with the initial application of heat at heat source 12, liquid sodium-potassium alloy is available to be pumped around the system and heat transfer can immediately begin from heat source 12 to heat sink 14, with no danger of overheating heat source 12.

In order to attain the cold trap effect at heat sink 14, the cross section of heat sink 14 must be designed to take into consideration the volume of solids which will result from the freezing of the lithium, and circulation of the liquids must continue at least until all the lithium is frozen out of the heat transfer system 10.

Control of the freezing process and prevention of damage to heat transfer system 10 is aided by the self regulating nature of the freezing process which occurs when the combination of immiscible liquids with different freezing temperatures continues to be circulated while the freezing is taking place.

Figure 2:
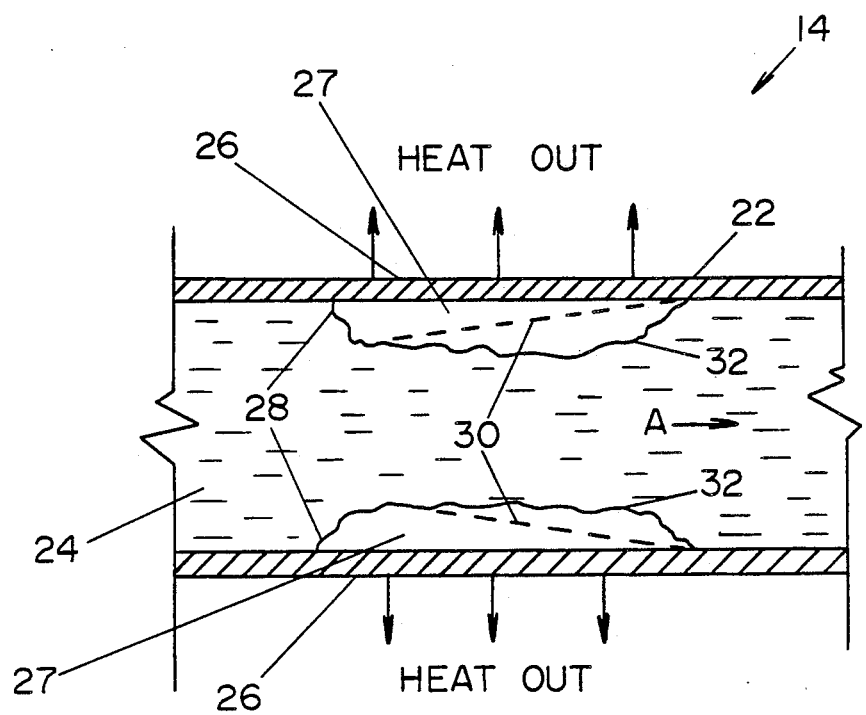
FIG. 2 is a cross section view of a typical flow path within the heat sink of the preferred embodiment, showing the self regulating action of the freezing process of one component of the heat transfer liquid.

FIG. 2, which shows a typical small section of heat sink 14, and which can represent either a circular cross section pipe or planar surfaces with long dimensions into the paper, illustrates the self regulating function of the invention during freezing. In FIG. 2 a small section of one passage 22 of heat sink 14 is shown with liquid 24, a combination of immiscible components such as lithium and sodium-potassium alloy as discussed above, flowing within passage 22, and with the flow direction shown by arrow A. For purposes of illustration it is assumed that heat is being removed only from regions 26 of passage 22. It is also possible and practical to remove heat from only one of the two portions of region 26 which are pictured, for instance, only the uppermost surface. This is particularly so if FIG. 2 is considered to represent planar surfaces facing each other.

As the structure of passage 22 is cooled to the freezing temperature of lithium, which is 181 degrees C., solidifying lithium 27 will first accumulate on the inside walls of passage 22 at locations 28, which are the first cold locations contacted by the flowing liquids. Of course, the sodium-potassium alloy will be unaffected by the deposition of the lithium. Although it might be assumed that location 28 would continue to develop an excess buildup of lithium, as shown by dashed lines 30, thus risking the blockage of passage 22 at that location, that does not occur.

Actually, the heat conduction characteristics of the solid lithium 27, and for that matter any solid material, prevent the excess buildup at one location, and assure a relatively equal buildup of solid material along entire cooled surface 26, as shown by profile 32, as long as some liquid flow continues so that heat transfer also continues.

This desirable situation occurs because the heat conduction across any significant thickness of frozen material causes a temperature gradient across the thickness of the frozen material with the colder temperature at the cold wall of passage 22, and the warmer temperature at the boundary between warm liquid 24 and solid 27. Moreover, the smaller the thickness of the frozen material is, the colder the material is at the boundary of that thickness and the liquid, since it is in better thermal contact with the cooled wall of passage 22. Thinner portions of the frozen component will therefore be colder and will preferrentially increase in thickness from additional material freezing upon them, thus tending to equalize the thickness of solid material 27. This relatively equal buildup prevents blockage of passage 22 as long as other portions of heat sink 14 are at the same temperature as the walls of passage 22, and as long as the lower freezing temperature material is available to continue to transfer heat and to equalize the liquid temperature within heat sink 14.

It is the volume of expansion chamber 18 which assures that there will always be enough liquid in the system to maintain heat transfer, regardless of whether the total volume of material is reduced or increased when one component is cold trapped out at the heat sink as it freezes.

In a typical heat sink heat exchanger, with, for instance, pipes of circular or other shaped cross sections, the frozen material will tend to deposit relatively equally throughout all the cooled heat sink surfaces, forming annular deposits on the interior surface of the pipes. Therefore, if sufficient volume has been designed into the heat sink pipes to more than accommodate all the higher freezing point component when it solidifies, then flow passages for the remaining liquid will be maintained in all the passages of the heat sink, and no blockages will occur.

At startup, when heat is applied to heat source 12, the invention acts particularly favorably in that it quickly reestablishes full heat transfer capabilities. At heat sink 14, the heat transferred from heat source 12 by the remaining liquid will always cause melting of the frozen material at the boundary between the frozen material and the liquid, because that surface is in intimate contact with the heated liquid, and the melted material is immediately carried away to expose new frozen surface. Heat transfer rates into the frozen material can be very high, particularly with liquid metals, because liquid metal convection heat transfer coefficients are extremely high. Furthermore, there is no solid barrier separating the two components, and also as the melted liquid is added to the combination liquid, the heat transfer becomes more effective and speeds up the melting of the remaining frozen material.

The present invention can also be used in heat storage applications. If, for instance, the higher freezing point component is a thermal storage material such as lithium hydride or an alkaline halide, and the lower freezing point component is an alkali metal such as sodium-potassium alloy, high rates of heat can be put into the sodium-potassium alloy which in turn transfers the heat into the frozen salt or lithium hydride which was deposited on the surfaces of the heat sink. As the salt or lithium hydride reaches its melting point, it is swept away exposing a fresh surface of solid material with which to absorb additional heat. Since the heat does not have to be conducted through the low thermal conductivity lithium hydride, heat can be deposited into the lithium hydride at very high rates.

At cooldown, as the lithium hydride releases heat to cold wall surfaces of the heat sink, it deposits upon the walls in a relatively uniform, dense layer. Since volume compensation can occur remote from the heat sink region where the freezing is occurring, the heat sink can be made very compact.

The present invention therefore furnishes a versatile, heat transfer system which provides enhanced thermal storage, high heat input rates, efficient heat transport, low pumping power, and rapid startup from the frozen state.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, the invention can be used with any immiscible combinations with different freezing-melting points, such as, wax and water, lithium and lithium floride, sodium-potassium alloy and lithium hydride and many others. Moreover, the invention can be used with heat sinks of various configurations of cross sections, such as circular or rectangular pipes.

What is claimed as new and for which Letters Patent of the United States are desired to be secured is:

1. In a heat transfer system which uses a liquid as the heat transfer medium and includes a heat source interconnected to a heat sink and an expansion chamber, with the liquid moved within the heat transfer system by a pumping means, the improvement comprising:
    a liquid heat transfer medium which is moved through the entire system which comprises a combination of at least two immiscible liquids with distinctly different freezing-melting temperatures, so that a first liquid will freeze before the others, and a second liquid will remain liquid under all conditions of anticipated use of the heat transfer system; and
    a heat sink of sufficient volume and cross section so that all frozen material resulting from freezing of the liquids can be accommodated on the inside surface of the heat sink while maintaining flow through paths for the remaining liquid with the flow through paths located adjacent to all existing frozen material, so that the surfaces of the frozen material are in intimate contact with the remaining liquid and no portion of the heat sink is blocked by frozen material.

2. The heat transfer system of claim 1 wherein the combination of liquids comprises lithium as the first liquid and sodium-potassium alloy as the second liquid.

3. The heat transfer system of claim 1 wherein the combination of liquids comprises 75% lithium and 25% sodium-potassium alloy.

4. The heat transfer system of claim 1 wherein the heat sink comprises at least one pipe of circular cross section, so that the frozen material forms an annular configuration on the inside surface of each pipe and the flow through paths are core openings in each pipe.

5. The heat transfer system of claim 1 wherein the expansion chamber is located remote from the heat sink so that liquid in the expansion chamber will not freeze.

6. The heat transfer system of claim 1 wherein the heat sink comprises at least one flow path with at least one planar surface from which heat is removed forming a buildup of frozen material on the planar surface.

* * * * *